(12) United States Patent
Glugla et al.

(10) Patent No.: US 10,683,837 B2
(45) Date of Patent: Jun. 16, 2020

(54) METHOD AND SYSTEM FOR DETECTING ENGINE KNOCK DURING TRANSIENT CONDITIONS

(71) Applicant: Ford Global Technologies, LLC, Dearborn, MI (US)

(72) Inventors: Christopher Paul Glugla, Macomb, MI (US); Rani Kiwan, Ann Arbor, MI (US); Mohannad Hakeem, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/155,394

(22) Filed: Oct. 9, 2018

(65) Prior Publication Data
US 2020/0109691 A1 Apr. 9, 2020

(51) Int. Cl.
F02D 35/02 (2006.01)
F02D 41/02 (2006.01)
F02P 5/152 (2006.01)

(52) U.S. Cl.
CPC ............ F02P 5/152 (2013.01); F02D 35/027 (2013.01); F02D 2200/025 (2013.01)

(58) Field of Classification Search
CPC ........... F02D 35/027; F02D 2200/1015; F02D 41/0052
See application file for complete search history.

(56) References Cited

U.S. PATENT DOCUMENTS

| | | | |
|---|---|---|---|
| 4,716,874 A * | 1/1988 | Hilliard | F02P 5/1516 123/406.14 |
| 4,761,992 A | 8/1988 | Staerzl | |
| 5,460,031 A * | 10/1995 | Fujishita | G01L 23/225 73/35.03 |
| 6,311,672 B1 * | 11/2001 | Morishita | F02D 35/027 123/406.36 |
| 9,441,556 B2 | 9/2016 | Hamama et al. | |
| 2008/0051981 A1 * | 2/2008 | Naber | G01L 23/225 701/111 |
| 2012/0192835 A1 | 8/2012 | Matsushima et al. | |
| 2014/0278010 A1 * | 9/2014 | Hamama | F02D 35/027 701/106 |
| 2017/0356364 A1 * | 12/2017 | Glugla | F02D 41/0087 |

OTHER PUBLICATIONS

Hakeem, M. et al., "Method and System for Variable Displacement Engine Knock Control," U.S. Appl. No. 15/985,257, filed May 21, 2018, 77 pages.
Hakeem, M. et al., "Method and System for Adjusting Engine Knock Background Noise of a Variable Displacement Engine," U.S. Appl. No. 15/985,337, filed May 21, 2018, 75 pages.
(Continued)

*Primary Examiner* — Long T Tran
(74) *Attorney, Agent, or Firm* — Geoffrey Brumbaugh; McCoy Russell LLP (57) ABSTRACT

Methods and systems are disclosed for operating an engine that includes a knock control system that may determine contributions of individual transient and steady-state noise sources to an engine background noise level. The contributions of the transient and steady-state individual noise sources may be the basis for establishing the presence or absence of knock in one or more engine cylinders.

17 Claims, 6 Drawing Sheets

(56) References Cited

OTHER PUBLICATIONS

Hakeem, M. et al., "Method and System for Adjusting Engine Knock Background Noise Levels," U.S. Appl. No. 15/985,428, filed May 21, 2018, 93 pages.
Kiwan, R. et al., "Method and System for Learning Contributions to an Engine Knock Background Noise Level," U.S. Appl. No. 16/122,065, filed Sep. 5, 2018, 49 pages.
Glugla, C. et al., "Method and System for Determining Piston Slap," U.S. Appl. No. 16/129,562, filed Sep. 12, 2018, 46 pages.
Glugla, C. et al., "Method and System for Determining Engine Knock Background Noise Levels," U.S. Appl. No. 16/144,762, filed Sep. 27, 2018, 56 pages.
Kiwan, R. et al., "Method and System for Applying Engine Knock Windows," U.S. Appl. No. 16/170,869, filed Oct. 25, 2018, 68 pages.
Kiwan, R. et al., "Method and System for Engine Knock Detection," U.S. Appl. No. 16/171,247, filed Oct. 25, 2018, 52 pages.
Kiwan, R. et al., "Method and System for Learning Contributions of Engine Knock Background Noise for a Variable Displacement Engine," U.S. Appl. No. 16/195,695, filed Nov. 19, 2018, 75 pages.

* cited by examiner

METHOD AND SYSTEM FOR DETECTING ENGINE KNOCK DURING TRANSIENT CONDITIONS

FIELD

The present application relates to methods and systems for applying engine knock background noise levels while an engine is operating in dynamically changing conditions.

BACKGROUND/SUMMARY

An engine may operate during conditions when engine load and speed change with vehicle operating conditions. For example, engine load may change in response to a human driver applying or releasing an accelerator pedal. Engine speed may change when a transmission shifts from a first gear to a second gear. If the engine is operating with advanced spark timing that is near minimum spark advance for best torque or with engine knock limited spark timing, the engine may enter detonation conditions and knock when engine speed and/or engine load change. The engine may knock when end gases in the engine cylinder ignite before they are ignited by a flame front of a spark that is produced via a spark plug. Ignition of the end gases may result in high frequency pressure changes that may cause the engine block to vibrate, thereby inducing an engine knocking sound. In addition, higher pressures resulting from ignition of the end gases may result piston degradation.

The propensity of an engine to knock may increase when the engine is operated under transient conditions because rapid changes in engine speed and engine load may induce fueling or spark timing errors that may increase the propensity for engine knock. Therefore, it may be desirable to reliably detect engine knock during transient engine operating conditions. However, engine knock background noise levels that are based on steady-state (e.g. conditions where engine speed and engine load change less than fifteen percent of their average values) conditions and that are applied to determine the presence or absence of engine knock may be less reliable during transient engine operating conditions. Consequently, it may be difficult to make an accurate assessment of the presence or absence of engine knock during transient engine operating conditions.

The inventors herein have developed an engine operating method, comprising: assessing an engine for knock via a controller according to a total engine knock background noise level that includes individual contributions (e.g., individual amount values) for steady-state and transient base engine knock background noise levels; and adjusting engine operation according to the assessment.

By including adjustments for transient engine knock background noise levels in a total engine knock background noise level, it may be possible to provide the technical result of improving engine knock detection during transient engine operating conditions where engine noise may increase as a function of acceleration of the engine's valve train and secondary acceleration (e.g., Coriolis acceleration) of the engine's valve train. In particular, the engine knock background noise level accuracy may be improved so that detection of engine knock may be improved. A total engine knock background noise level for each engine cylinder may be established, and the total engine knock background noise level may include individual and unique values representing steady-state and transient condition noise levels.

The present description may provide several advantages. In particular, the approach may improve detection of engine knock during transient engine operating conditions. Further, the approach provides for adjusting a total engine knock background noise level for both transient and steady-state engine operating conditions. Further still, the approach may be applicable to variable displacement engines and engines that are not variable displacement engines.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1A:
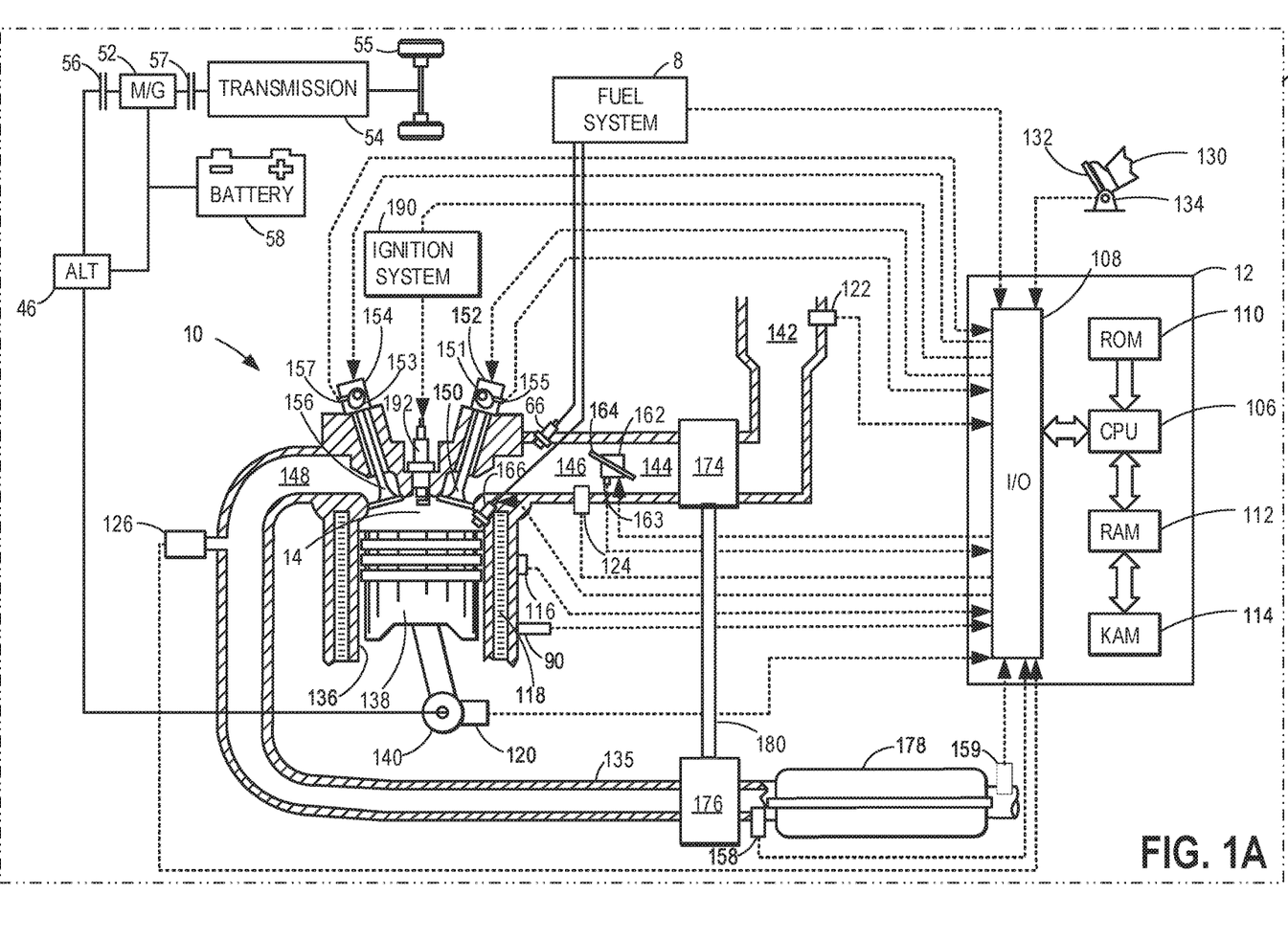
FIG. 1A shows a schematic depiction of an engine system of a vehicle.
Figure 1B:
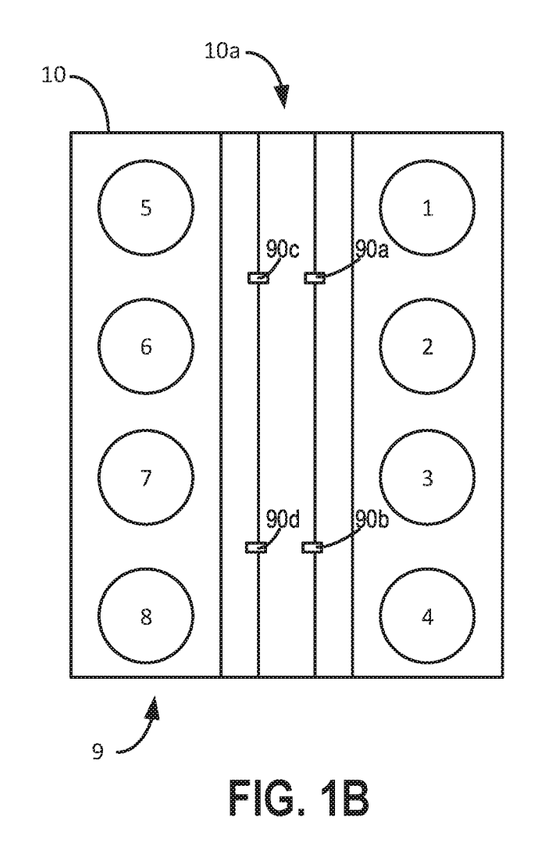
FIG. 1B shows example locations for knock sensors for a V8 engine.
Figure 1C:
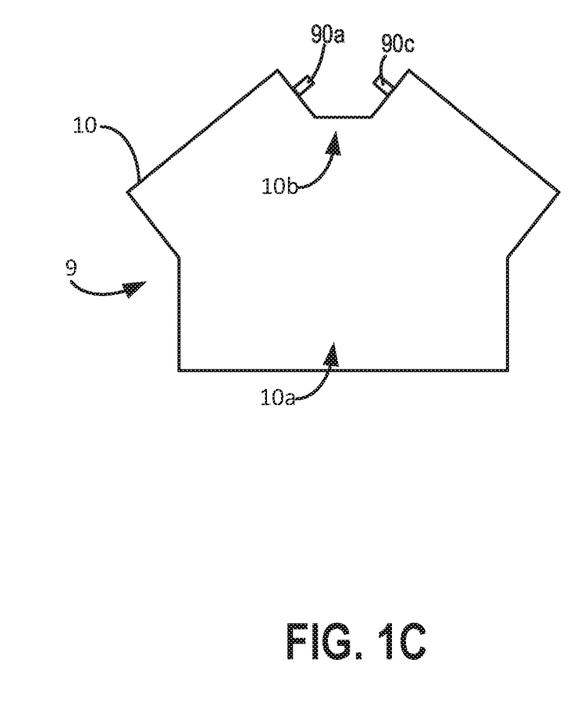
FIG. 1C shows an alternative view of knock sensor locations for the V8 engine.
Figure 2:
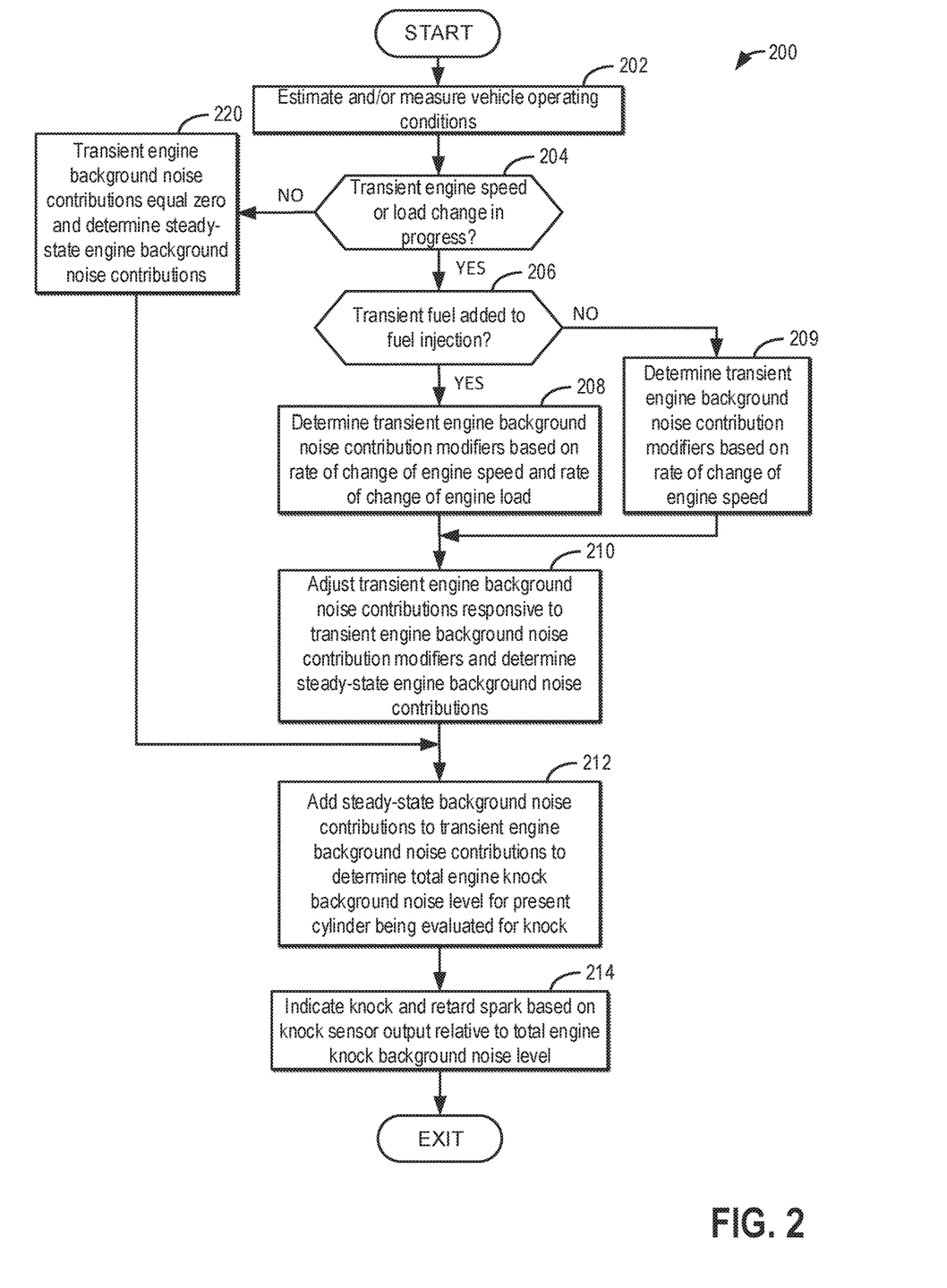
FIG. 2 shows a high level flow chart of a way to adjust a total engine knock background noise level and detect engine knock.
Figure 4:
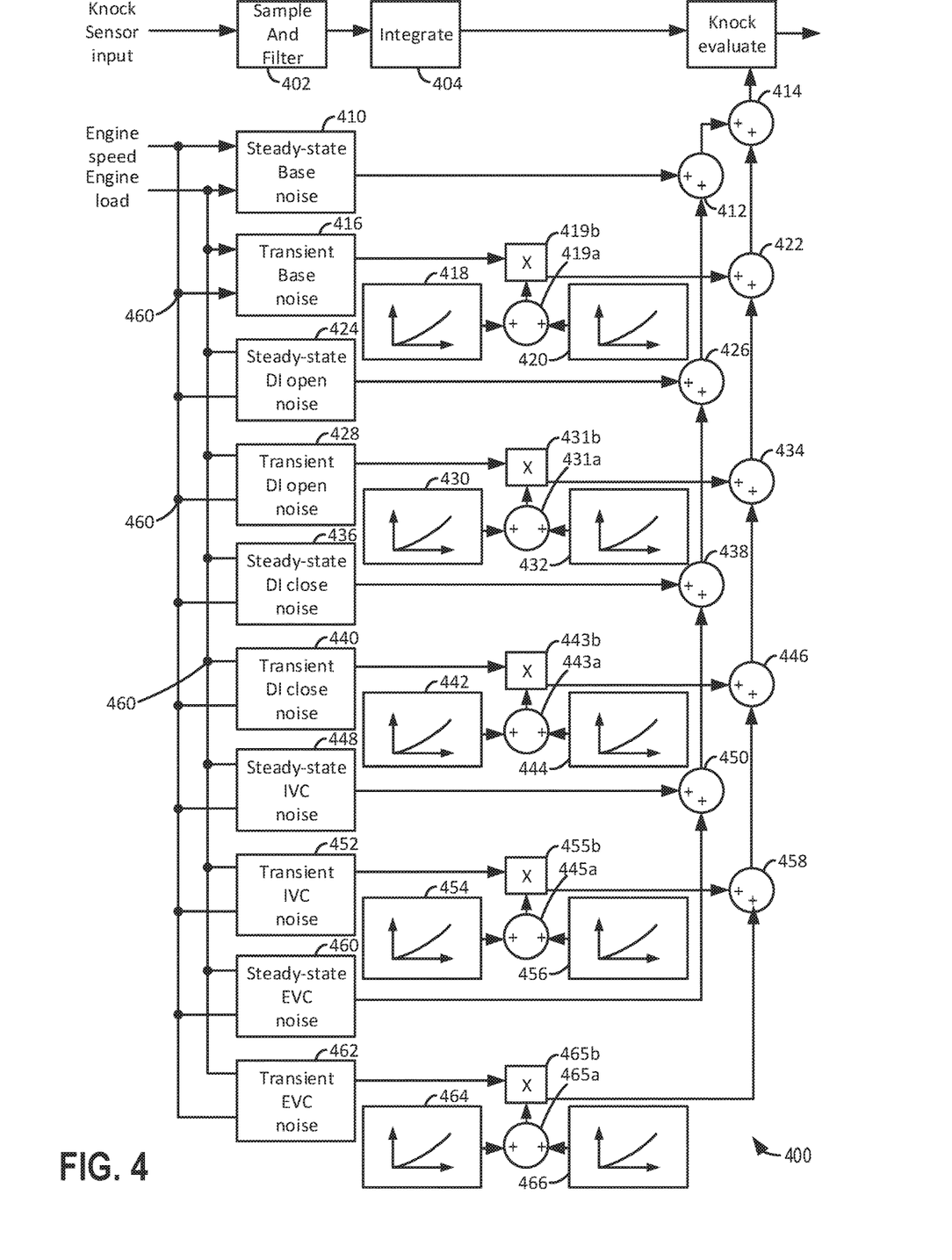
FIG. 4 shows a block diagram for determining a total engine knock background noise level.
Figure 5:
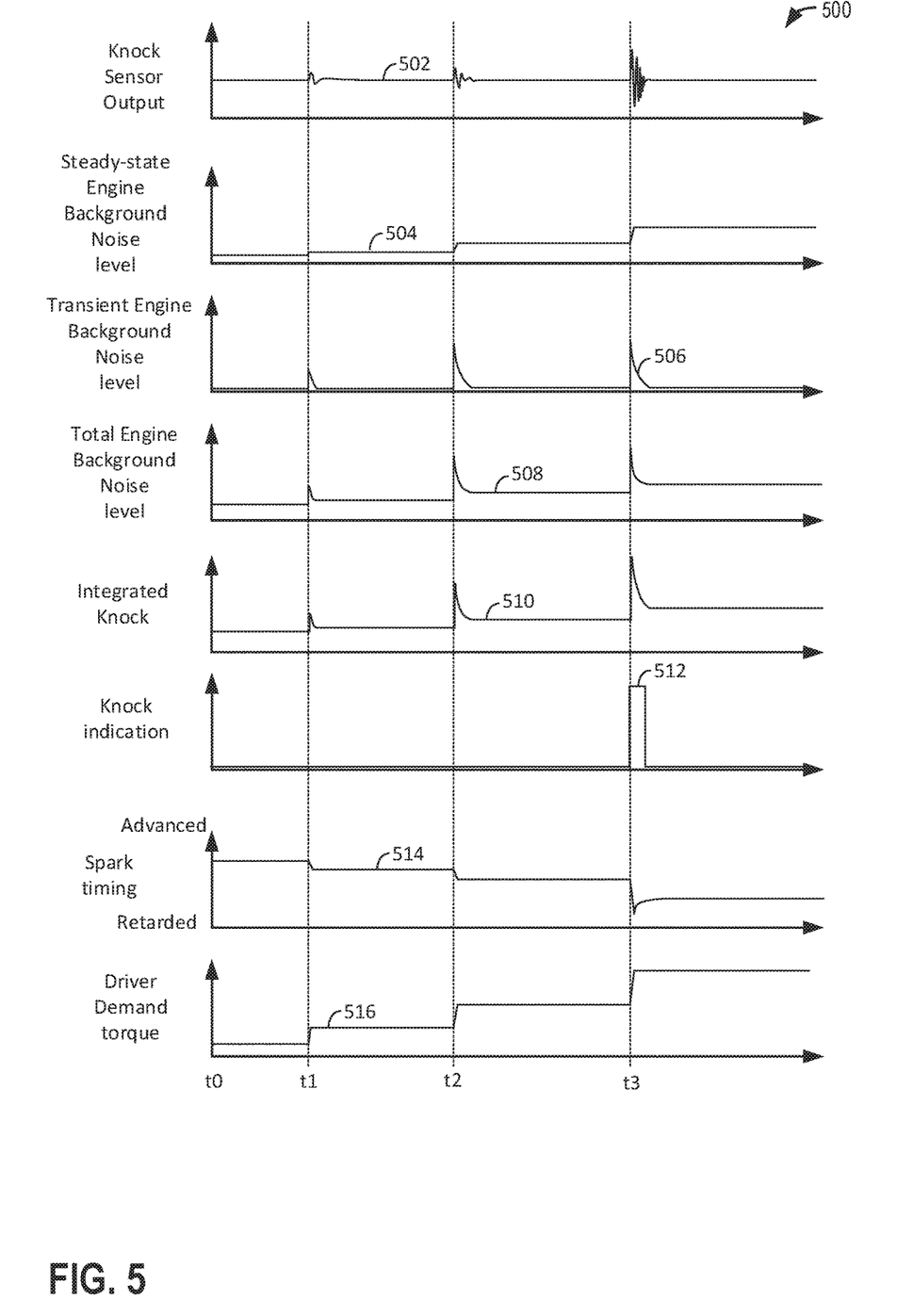
FIG. 5 shows an example engine operating sequence where steady-state and transient engine knock background noise levels are applied to determine the presence of engine knock according to the method of FIG. 2.

The following description relates to systems and methods for operating an engine that includes a knock control system. The engine may be of the type that is shown in FIGS. 1A-1C. The engine may be operated according to the method of FIG. 2. The method may apply both steady-state and transient engine knock background noise levels to determine the presence or absence of engine knock. An engine operating sequence that includes engine knock windows in shown in FIG. 3. A block diagram that illustrates how a total engine knock background noise level may be determined is shown in FIG. 4. An engine operating sequence to detect engine knock according to the method of FIG. 2 is shown in FIG. 5.

Turning now to the figures, FIG. 1A depicts an example of a cylinder 14 of an internal combustion engine 10, which may be included in a vehicle 5. Engine 10 may be controlled at least partially by a control system, including a controller 12, and by input from a human vehicle operator 130 via an input device 132. The controller 12 receives signals from the various sensors shown in FIGS. 1A and 2. Controller 12 employs the actuators shown in FIGS. 1A-1C to adjust engine operation based on the received signals and instructions stored in memory of controller 12.

In this example, input device 132 includes an accelerator pedal and a pedal position sensor 134 for generating a proportional pedal position signal. Cylinder (herein, also "combustion chamber") 14 of engine 10 may include combustion chamber walls 136 with a piston 138 positioned therein. Piston 138 may be coupled to a crankshaft 140 so that reciprocating motion of the piston is translated into rotational motion of the crankshaft. Crankshaft 140 may be coupled to at least one vehicle wheel 55 of vehicle 5 via a transmission 54, as further described below. Further, a starter motor (not shown) may be coupled to crankshaft 140 via a flywheel to enable a starting operation of engine 10.

In some examples, vehicle 5 may be a hybrid vehicle with multiple sources of torque available to one or more vehicle wheels 55. In other examples, vehicle 5 is a conventional vehicle with only an engine or an electric vehicle with only an electric machine(s). In the example shown, vehicle 5 includes engine 10 and an electric machine 52. Electric machine 52 may be a motor or a motor/generator. Crankshaft 140 of engine 10 and electric machine 52 are connected via transmission 54 to vehicle wheels 55 when one or more clutches 56 are engaged. In the depicted example, a first clutch 56 is provided between crankshaft 140 and electric machine 52, and a second clutch 57 is provided between electric machine 52 and transmission 54. Controller 12 may send a signal to an actuator of each clutch 56 to engage or disengage the clutch, so as to connect or disconnect crankshaft 140 from electric machine 52 and the components connected thereto, and/or connect or disconnect electric machine 52 from transmission 54 and the components connected thereto. Transmission 54 may be a gearbox, a planetary gear system, or another type of transmission.

The powertrain may be configured in various manners, including as a parallel, a series, or a series-parallel hybrid vehicle. In electric vehicle examples, a system battery 58 may be a traction battery that delivers electrical power to electric machine 52 to provide torque to vehicle wheels 55. In some examples, electric machine 52 may also be operated as a generator to provide electrical power to charge system battery 58, for example, during a braking operation. It will be appreciated that in other examples, including non-electric vehicle examples, system battery 58 may be a typical starting, lighting, ignition (SLI) battery coupled to an alternator 46.

Alternator 46 may be configured to charge system battery 58 using engine torque via crankshaft 140 during engine running. In addition, alternator 46 may power one or more electrical systems of the engine, such as one or more auxiliary systems including a heating, ventilation, and air conditioning (HVAC) system, vehicle lights, an on-board entertainment system, and other auxiliary systems based on their corresponding electrical demands. In one example, a current drawn on the alternator may continually vary based on each of an operator cabin cooling demand, a battery charging requirement, other auxiliary vehicle system demands, and motor torque. A voltage regulator may be coupled to alternator 46 in order to regulate the power output of the alternator based upon system usage requirements, including auxiliary system demands.

Cylinder 14 of engine 10 can receive intake air via a series of intake passages 142 and 144 and an intake manifold 146. Intake manifold 146 can communicate with other cylinders of engine 10 in addition to cylinder 14. One or more of the intake passages may include one or more boosting devices, such as a turbocharger or a supercharger. For example, FIG. 1A shows engine 10 configured with a turbocharger, including a compressor 174 arranged between intake passages 142 and 144 and an exhaust turbine 176 arranged along an exhaust passage 135. Compressor 174 may be at least partially powered by exhaust turbine 176 via a shaft 180 when the boosting device is configured as a turbocharger. However, in other examples, such as when engine 10 is provided with a supercharger, compressor 174 may be powered by mechanical input from a motor or the engine and exhaust turbine 176 may be optionally omitted. In still other examples, engine 10 may be provided with an electric supercharger (e.g., an "eBooster"), and compressor 174 may be driven by an electric motor. In still other examples, engine 10 may not be provided with a boosting device, such as when engine 10 is a naturally aspirated engine.

A throttle 162 including a throttle plate 164 may be provided in the engine intake passages for varying a flow rate and/or pressure of intake air provided to the engine cylinders. For example, throttle 162 may be positioned downstream of compressor 174, as shown in FIG. 1A, or may be alternatively provided upstream of compressor 174. A position of throttle 162 may be communicated to controller 12 via a signal from a throttle position sensor.

An exhaust manifold 148 can receive exhaust gases from other cylinders of engine 10 in addition to cylinder 14. An exhaust gas sensor 126 is shown coupled to exhaust manifold 148 upstream of an emission control device 178. Exhaust gas sensor 126 may be selected from among various suitable sensors for providing an indication of an exhaust gas air/fuel ratio (AFR), such as a linear oxygen sensor or UEGO (universal or wide-range exhaust gas oxygen), a two-state oxygen sensor or EGO, a HEGO (heated EGO), a NOx, a HC, or a CO sensor, for example. In the example of FIG. 1A, exhaust gas sensor 126 is a UEGO sensor. Emission control device 178 may be a three-way catalyst, a NOx trap, various other emission control devices, or combinations thereof. In the example of FIG. 1A, emission control device 178 is a three-way catalyst. Oxygen sensor 159 may monitor emission control device 178 for degradation.

Each cylinder of engine 10 may include one or more intake valves and one or more exhaust valves. For example, cylinder 14 is shown including at least one intake poppet valve 150 and at least one exhaust poppet valve 156 located at an upper region of cylinder 14. In some examples, each cylinder of engine 10, including cylinder 14, may include at least two intake poppet valves and at least two exhaust poppet valves located at an upper region of the cylinder. In this example, intake valve 150 may be controlled by controller 12 by cam actuation via cam actuation system 152, including one or more cams 151. Similarly, exhaust valve 156 may be controlled by controller 12 via cam actuation system 154, including one or more cams 153. The position of intake valve 150 and exhaust valve 156 may be determined by valve position sensors (not shown) and/or camshaft position sensors 155 and 157, respectively.

During some conditions, controller 12 may vary the signals provided to cam actuation systems 152 and 154 to control the opening and closing of the respective intake and exhaust valves. The intake and exhaust valve timing may be controlled concurrently, or any of a possibility of variable intake cam timing, variable exhaust cam timing, dual independent variable cam timing, or fixed cam timing may be used. Each cam actuation system may include one or more cams and may utilize one or more of variable displacement engine (VDE), cam profile switching (CPS), variable cam timing (VCT), variable valve timing (VVT), and/or variable valve lift (VVL) systems that may be operated by controller 12 to vary valve operation. In alternative examples, intake valve 150 and/or exhaust valve 156 may be controlled by electric valve actuation. For example, cylinder 14 may alternatively include an intake valve controlled via electric valve actuation and an exhaust valve controlled via cam actuation, including CPS and/or VCT systems. In other examples, the intake and exhaust valves may be controlled by a common valve actuator (or actuation system) or a variable valve timing actuator (or actuation system).

As further described herein, intake valve 150 and exhaust valve 156 may be deactivated during VDE mode via electrically actuated rocker arm mechanisms. In another example, intake valve 150 and exhaust valve 156 may be deactivated via a CPS mechanism in which a cam lobe with no lift is used for deactivated valves. Still other valve deactivation mechanisms may also be used, such as for electrically actuated valves. In one example, deactivation of intake valve 150 may be controlled by a first VDE actuator (e.g., a first electrically actuated rocker arm mechanism, coupled to intake valve 150) while deactivation of exhaust valve 156 may be controlled by a second VDE actuator (e.g., a second electrically actuated rocker arm mechanism, coupled to exhaust valve 156). In alternate examples, a single VDE actuator may control deactivation of both intake and exhaust valves of the cylinder. In still other examples, a single cylinder valve actuator deactivates a plurality of cylinders (both intake and exhaust valves), such as all of the cylinders in an engine bank, or a distinct actuator may control deactivation for all of the intake valves while another distinct actuator controls deactivation for all of the exhaust valves of the deactivated cylinders. It will be appreciated that if the cylinder is a non-deactivatable cylinder of the VDE engine, then the cylinder may not have any valve deactivating actuators. Each engine cylinder may include the valve control mechanisms described herein. Intake and exhaust valves are held in closed positions over one or more engine cycles when deactivated so as to prevent flow into or out of cylinder 14.

Cylinder 14 can have a compression ratio, which is a ratio of volumes when piston 138 is at bottom dead center (BDC) to top dead center (TDC). In one example, the compression ratio is in the range of 9:1 to 10:1. However, in some examples where different fuels are used, the compression ratio may be increased. This may happen, for example, when higher octane fuels or fuels with a higher latent enthalpy of vaporization are used. The compression ratio may also be increased if direct injection is used due to its effect on engine knock.

Each cylinder of engine 10 may include a spark plug 192 for initiating combustion. An ignition system 190 can provide an ignition spark to combustion chamber 14 via spark plug 192 in response to a spark advance signal from controller 12, under select operating modes. Spark timing may be adjusted based on engine operating conditions and driver torque demand. For example, spark may be provided at minimum spark advance for best torque (MBT) timing to maximize engine power and efficiency. Controller 12 may input engine operating conditions, including engine speed, engine load, and exhaust gas AFR, into a look-up table and output the corresponding MBT timing for the input engine operating conditions. In other examples, spark may be retarded from MBT, such as to expedite catalyst warm-up during engine start or to reduce an occurrence of engine knock.

In some examples, each cylinder of engine 10 may be configured with one or more fuel injectors for providing fuel thereto. As a non-limiting example, cylinder 14 is shown including a direct fuel injector 166 and a port fuel injector 66. Fuel injectors 166 and 66 may be configured to deliver fuel received from a fuel system 8. Fuel system 8 may include one or more fuel tanks, fuel pumps, and fuel rails. Fuel injector 166 is shown coupled directly to cylinder 14 for injecting fuel directly therein in proportion to a pulse width of a signal received from controller 12. Port fuel injector 66 may be controlled by controller 12 in a similar way. In this manner, fuel injector 166 provides what is known as direct injection (hereafter also referred to as "DI") of fuel into cylinder 14. While FIG. 1A shows fuel injector 166 positioned to one side of cylinder 14, fuel injector 166 may alternatively be located overhead of the piston, such as near the position of spark plug 192. Such a position may increase mixing and combustion when operating the engine with an alcohol-based fuel due to the lower volatility of some alcohol-based fuels. Alternatively, the injector may be located overhead and near the intake valve to increase mixing. Fuel may be delivered to fuel injectors 166 and 66 from a fuel tank of fuel system 8 via fuel pumps and fuel rails. Further, the fuel tank may have a pressure transducer providing a signal to controller 12.

Fuel injectors 166 and 66 may be configured to receive different fuels from fuel system 8 in varying relative amounts as a fuel mixture and further configured to inject this fuel mixture directly into cylinder. For example, fuel injector 166 may receive alcohol fuel and fuel injector 66 may receive gasoline. Further, fuel may be delivered to cylinder 14 during different strokes of a single cycle of the cylinder. For example, directly injected fuel may be delivered at least partially during a previous exhaust stroke, during an intake stroke, and/or during a compression stroke. Port injected fuel may be injected after intake valve closing of a previous cycle of the cylinder receiving fuel and up until intake valve closing of the present cylinder cycle. As such, for a single combustion event (e.g., combustion of fuel in the cylinder via spark ignition), one or multiple injections of fuel may be performed per cycle via either or both injectors. The multiple DI injections may be performed during the compression stroke, intake stroke, or any appropriate combination thereof in what is referred to as split fuel injection.

Fuel tanks in fuel system 8 may hold fuels of different fuel types, such as fuels with different fuel qualities and different fuel compositions. The differences may include different alcohol content, different water content, different octane, different heats of vaporization, different fuel blends, and/or combinations thereof, etc. One example of fuels with different heats of vaporization includes gasoline as a first fuel type with a lower heat of vaporization and ethanol as a second fuel type with a greater heat of vaporization. In another example, the engine may use gasoline as a first fuel type and an alcohol-containing fuel blend, such as E85 (which is approximately 85% ethanol and 15% gasoline) or M85 (which is approximately 85% methanol and 15% gasoline), as a second fuel type. Other feasible substances include water, methanol, a mixture of alcohol and water, a mixture of water and methanol, a mixture of alcohols, etc. In still another example, both fuels may be alcohol blends with varying alcohol compositions, wherein the first fuel type may be a gasoline alcohol blend with a lower concentration of alcohol, such as Eli) (which is approximately 10% ethanol), while the second fuel type may be a gasoline alcohol blend with a greater concentration of alcohol, such as E85 (which is approximately 85% ethanol). Additionally, the first and second fuels may also differ in other fuel qualities, such as a difference in temperature, viscosity, octane number, etc. Moreover, fuel characteristics of one or both fuel tanks may vary frequently, for example, due to day to day variations in tank refilling.

Controller 12 is shown in FIG. 1A as a microcomputer, including a microprocessor unit 106, input/output ports 108, an electronic storage medium for executable programs (e.g., executable instructions) and calibration values shown as non-transitory read-only memory chip 110 in this particular example, random access memory 112, keep alive memory 114, and a data bus. Controller 12 may receive various signals from sensors coupled to engine 10, including signals previously discussed and additionally including a measurement of inducted mass air flow (MAF) from a mass air flow sensor 122; an engine coolant temperature (ECT) from a temperature sensor 116 coupled to a cooling sleeve 118; an exhaust gas temperature from a temperature sensor 158 coupled to exhaust passage 135; a crankshaft position signal from a Hall effect sensor 120 (or other type) coupled to crankshaft 140; throttle position from a throttle position sensor 163; signal UEGO from exhaust gas sensor 126, which may be used by controller 12 to determine the air-fuel ratio of the exhaust gas; oxygen sensor 159; engine vibrations (e.g., caused by knock) via vibration sensing knock sensor 90; and an absolute manifold pressure signal (MAP) from a MAP sensor 124. An engine speed signal, RPM, may be generated by controller 12 from crankshaft position. The manifold pressure signal MAP from MAP sensor 124 may be used to provide an indication of vacuum or pressure in the intake manifold. Controller 12 may infer an engine temperature based on the engine coolant temperature and infer a temperature of emission control device 178 based on the signal received from temperature sensor 158.

Controller 12 receives signals from the various sensors of FIG. 1A and employs the various actuators of FIG. 1A to adjust engine operation based on the received signals and instructions stored on a memory of the controller. For example, the controller may transition the engine to operating in VDE mode by actuating valve actuators 152 and 154 to deactivate selected cylinders, as further described with respect to FIG. 5.

As described above, FIG. 1A shows only one cylinder of a multi-cylinder engine. As such, each cylinder may similarly include its own set of intake/exhaust valves, fuel injector(s), spark plug, etc. It will be appreciated that engine 10 may include any suitable number of cylinders, including 2, 3, 4, 5, 6, 8, 10, 12, or more cylinders. Further, each of these cylinders can include some or all of the various components described and depicted by FIG. 1A with reference to cylinder 14.

During selected conditions, such as when the full torque capability of engine 10 is not requested, one of a first or a second cylinder group may be selected for deactivation by controller 12 (herein also referred to as a VDE mode of operation). During the VDE mode, cylinders of the selected group of cylinders may be deactivated by shutting off respective fuel injectors 166 and 66. Further, valves 150 and 156 may be deactivated and held closed over one or more engine cycles. While fuel injectors of the disabled cylinders are turned off, the remaining enabled cylinders continue to carry out combustion, with corresponding fuel injectors and intake and exhaust valves active and operating. To meet torque requirements, the controller adjusts the amount of air entering active engine cylinders. Thus, to provide equivalent engine torque that an eight cylinder engine produces at 0.2 engine load and a particular engine speed, the active engine cylinders may operate at higher pressures than engine cylinders when the engine is operated with all engine cylinders being active. This requires higher manifold pressures, resulting in lowered pumping losses and increased engine efficiency. Additionally, the lower effective surface area (from only the active cylinders) exposed to combustion reduces engine heat losses, increasing the thermal efficiency of the engine.

Referring now to FIG. 1B, a plan view of engine 10 is shown. Front 10a of engine 10 may include a front end accessory drive (FEAD) (not shown) to provide power to an alternator, power steering system, and air conditioning compressor. In this example, engine 10 is shown in a V8 configuration with eight cylinders that are numbered 1-8. Engine knock may be sensed via four knock sensors 90a-90d. The knock sensors are positioned in the valley of engine block 9. In this example, output of knock sensor 90a is sampled via controller 12 during the knock windows (e.g., crankshaft angular intervals) of engine cylinders 1 and 2. Thus, knock sensor 90a is associated with cylinders 1 and 2. Output of knock sensor 90b is sampled via controller 12 during the knock windows of engine cylinders 3 and 4. Thus, knock sensor 90a is associated with cylinders 3 and 4. Output of knock sensor 90c is sampled via controller 12 during the knock windows of engine cylinders 5 and 6. Thus, knock sensor 90c is associated with cylinders 5 and 6. Output of knock sensor 90d is sampled via controller 12 during the knock windows of engine cylinders 7 and 8. Thus, knock sensor 90d is associated with cylinders 7 and 8. The plurality of knock sensors improves the ability to detect knock for each cylinder since attenuation of engine vibrations from knock increases as the distance from the knocking cylinder to the knock sensor increases. Knock sensor output is not sampled when the knock windows are closed.

Referring now to FIG. 1C, a front view of engine 10 is shown. Engine block 9 includes a valley 10b where engine knock sensors 90a and 90c are mounted to block 9. By mounting knock sensors 90a and 90c in the valley 10b, a good signal to noise ratio may be available so that knock may be more reliably detected. However, the mounting locations of knock sensors 90a-90d may also allow some fuel injector control actions to be observed by some sensors and not by others. Thus, background noise levels of some cylinders may be higher or lower than other cylinders. Additionally, the distance of a fuel injector that opens or closes near a knock window of another engine cylinder may affect an amount of time that it takes for a vibration to travel from the operating fuel injector to the knock sensor. And, a longer time for the vibration to travel from the fuel injector to the knock sensor may allow the vibration to enter a knock window for a cylinder. As such, knock sensor location, firing order, and engine configuration may also affect engine knock background noise levels for some engine cylinders.

Thus, the system of FIGS. 1A-1C provides for a system for operating an engine, comprising: an engine including at least one vibration sensing engine knock sensor; and a controller including executable instructions stored in non-transitory memory to generate a total engine knock background noise level from individual and unique contributions of transient and steady-state engine knock base background noise levels that do not include noise from poppet valves and fuel injectors opening and/or closing during a knock window, and adjust engine operation responsive to the total engine knock background noise level. The system further comprises additional instructions to adjust the transient engine knock base background noise level responsive to a rate of change of engine speed. The system further comprises additional instructions to adjust the transient engine knock base background noise level responsive to a rate of change of engine load. The system further comprises additional instructions to generate the total engine knock background noise level from a transient engine knock background noise level that includes noise of a poppet valve closing during the knock window. The system further comprises additional instructions to generate the total engine knock background noise level from a transient engine knock background noise level that includes noise of a fuel injector opening and/or closing during the knock window. The system includes where adjusting engine operation includes retarding spark timing.

Referring now to FIG. 2, a method for operating an engine is shown. The method of FIG. 2 may be included in and may cooperate with the system of FIGS. 1A-1C. At least portions of method 200 may be incorporated in the system of FIGS. 1A-1C as executable instructions stored in non-transitory memory. In addition, other portions of method 200 may be performed via a controller transforming operating states of devices and actuators in the physical world. The controller may employ engine actuators of the engine system to adjust engine operation. Further, method 200 may determine selected control parameters from sensor inputs. The engine may be rotating and combusting fuel when the method of FIG. 2 is being performed.

At 202, method 200 determines vehicle and engine operating conditions via the sensors described in FIGS. 1A-1C. Method 200 may determine operating conditions including but not limited to engine speed, engine load, engine temperature, ambient temperature, fuel injection timing, knock sensor output, fuel type, fuel octane, engine position, engine air flow, change in cylinder air flow, and change in engine speed. Method 200 proceeds to 204.

At 204, method 200 judges if there is a transient engine speed or engine load change that is in progress. If method 200 judges that engine speed has changed by greater than a threshold speed amount in a predetermined period of time (e.g., 300 RPM per second), or if engine load has changed by greater than a threshold load amount in a predetermined period of time (e.g., 0.1 load per second), then the answer is yes and method 200 proceeds to 206. Otherwise, the answer is no and method 200 proceeds to 220.

At 220, method 200 adjusts transient engine background noise levels to a value of zero and determines steady-state engine background noise levels. The transient engine background noise levels include the following for each engine cylinder (j): the total transient engine knock background noise level (Cyl_bkg_noise_trans(j)), transient engine knock base noise level (Cyl_base_noise_trans(j)) that does not include noise from poppet valves or fuel injectors opening and/or closing during a knock window of cylinder (j), transient engine knock injector closing noise level (Cyl_inj_cnoise_trans(j)) that does not include base engine noise or poppet valve noise during the knock window of cylinder (j), transient engine knock injector opening noise level (Cyl_inj_onoise_trans(j)) that does not include base engine noise or poppet valve noise during the knock window of cylinder (j), transient engine intake poppet valve noise level (Cyl_ivlv_noise_trans(j) that does not include base engine noise or fuel injector opening or closing noise generated during the knock window of cylinder (j), transient engine exhaust poppet valve noise level (Cyl_evlv_noise_trans(j) that does not include base engine noise or fuel injector opening or closing noise generated during the knock window of cylinder (j), and where j is the cylinder number of the engine. Thus, the values of Cyl_bkg_noise_trans(j), Cyl_base_noise_trans(j), Cyl_inj_cnoise_trans(j), Cyl_inj_onoise_trans(j), Cyl_ivlv_noise_trans(j), and Cyl_evlv_noise_trans(j) are adjusted to zero since the engine is not experiencing transient conditions. The total transient engine knock background noise level may be expressed as:

$$Cyl\_bkg\_noise\_trans(j) = Cyl\_base\_noise\_trans(j) + Cyl\_inj\_cnoise\_trans(j) + Cyl\_inj\_onoise\_trans(j) + Cyl\_ivlv\_noise\_trans(j) + Cyl\_evlv\_noise\_trans(j)$$

Thus, Cyl_bkg_noise_trans may be determined via summing Cyl_base_noise_trans(j), Cyl_inj_cnoise_trans(j), Cyl_inj_onoise_trans(j), Cyl_ivlv_noise_trans(j), and Cyl_evlv_noise_trans(j). However, when the engine is operating in steady-state conditions, the value of each transient parameter is zero.

Method 200 also determines the steady-state engine background noise levels at 220. In one example, the steady state values are stored in tables or functions that may be indexed or referenced by the present engine speed and engine load. The steady-state engine background noise levels include the following for each engine cylinder (j): the total steady-state engine knock background noise level (Cyl_bkg_noise_ss (j)), steady-state engine knock base noise level (Cyl_base_noise_ss(j)) that does not include noise from poppet valves or fuel injectors opening and/or closing during a knock window of cylinder (j), steady-state engine knock injector opening noise level (Cyl_inj_onoise_ss(j)) that does not include base engine noise or poppet valve noise during the knock window of cylinder (j), steady-state engine knock injector closing noise level (Cyl_inj_cnoise_ss(j)) that does not include base engine noise or poppet valve noise during the knock window of cylinder (j), steady-state engine poppet intake valve noise level (Cyl_ivlv_noise_ss(j) that does not include base engine noise or fuel injector noise during the knock window of cylinder (j), steady-state engine poppet exhaust valve noise level (Cyl_evlv_noise_ss(j) that does not include base engine noise or fuel injector noise during the knock window of cylinder (j) and where j is the cylinder number of the engine. The values of Cyl_base_noise_ss(j), Cyl_inj_onoise_ss(j), Cyl_inj_cnoise_ss(j), Cyl_ivlv_noise_ss(j), and Cyl_evlv_noise_ss(j) may be empirically determined via operating the engine on a dynamometer at steady-state speeds and loads while processing knock sensor output during knock windows of each cylinder (j). The total steady-state engine knock background noise level may be expressed as:

$$Cyl\_bkg\_noise\_ss(j) = Cyl\_base\_noise\_ss(j) + Cyl\_inj\_onoise\_ss(j) + Cyl\_inj\_cnoise\_ss(j) + Cyl\_ivlv\_noise\_ss(j) + +Cyl\_evlv\_noise\_ss(j)$$

Thus, Cyl_bkg_noise_ss may be determined via summing Cyl_base_noise_ss(j), Cyl_inj_onoise_ss(j), Cyl_inj_cnoise_ss(j), Cyl_ivlv_noise_ss(j), and Cyl_evlv_noise_ss(j). The steady-state engine knock background noise levels may also be learned when the engine is operating in the vehicle so that engine knock background noise levels may change as the engine ages. Method 200 proceeds to 212 after the transient engine knock background noise levels and the steady-state engine knock background noise level are determined.

At 206, method 200 judges if transient fuel has been added to the amount of fuel scheduled to be injected to one or more engine cylinders. A main fuel injection amount for a cylinder may be scheduled more than 180 crankshaft degrees before the intake stroke of the cylinder receiving the fuel. Consequently, the cylinder air charge may increase while the scheduled main fuel injection amount is being injected to the cylinder. However, a makeup fuel injection may be scheduled after the scheduled main fuel injection to the cylinder to improve cylinder air-fuel control during transient conditions. The second fuel injection amount may change the fuel injector noise due to additional fuel injector opening and closing events that are related to the increase in cylinder air charge. If method 200 judges that transient fuel is added or to be added to the main fuel injection into the cylinder being evaluated for engine knock (e.g., cylinder (j)), then the answer is yes and method 200 proceeds to 208. Otherwise, the answer is no and method 200 proceeds to 209.

At 208, method 200 determines modifier values for the transient engine knock background noise level contributions Cyl_base_noise_trans(j), Cyl_inj_onoise_trans(j), Cyl_inj_cnoise_trans(j), Cyl_ivlv_noise_trans(j), and Cyl_evlv_noise_trans(j) due to the change in cylinder air charge. The modifiers may be expressed as: Adj_base_dα is a modifier (e.g., scalar real number) for the transient engine knock base noise level based on the rate of change of cylinder air charge, Adj_base_dω is a modifier for the transient engine knock base noise level based on the rate of change of engine speed, Adj_oinj_dα is a modifier for the transient engine knock injector opening noise level based on rate of change of cylinder air charge, Adj_oinj_dω is a modifier for the transient engine knock injector opening noise level based on rate of change of engine speed, Adj_cinj_dα is a modifier for the transient engine knock injector closing noise level based on rate of change of cylinder air charge, Adj_cinj_dω is a modifier for the transient engine knock injector closing noise level based on rate of change of engine speed, Adj_ivlv_dα is a modifier for the transient engine intake poppet valve noise level based on the rate of change of cylinder air charge, and Adj_ivlv_dω is a modifier for the transient engine intake poppet valve noise level based on the rate of change of engine speed, Adj_evlv_dα is a modifier for the transient engine exhaust poppet valve noise level based on the rate of change of cylinder air charge, and Adj_evlv_dω is a modifier for the transient engine exhaust poppet valve noise level based on the rate of change of engine speed.

Each of the modifier values may be determined via indexing a function that houses empirically determined modifier values that may be referenced by the change in cylinder air charge. For example, a value of Adj_base_dα may be determined via indexing a first function or table via the present change in cylinder air charge. A value of Adj_base_dω may be determined via indexing a second function or table via the present change in engine speed. Likewise, Adj_inj_dα may be determined via indexing a third function or table via the present change in cylinder air charge, and so on. The cylinder air charge rate of charge dependent functions may increase from a value of zero to a value of one as the rate of change in cylinder air charge amount increases from zero to a predetermined value. Similarly, the cylinder air charge rate of charge dependent functions may increase from a value of zero to a value of one as the rate of change in engine speed amount increases from zero to a predetermined value. Method 200 proceeds to 210 after adjusting the transient engine background noise contributions for the change in cylinder air charge.

At 209, method 200 determines modifier values for the transient engine knock background noise level contributions Cyl_base_noise_trans(j), Cyl_inj_cnoise_trans(j), Cyl_inj_onoise_trans(j), Cyl_ivlv_noise_trans(j), and Cyl_evlv_noise_trans(j) due to the change in cylinder air charge. The modifiers may be expressed as: Adj_base_dα is a modifier for the transient engine knock base noise level based on the rate of change of cylinder air charge that has a value of zero, Adj_base_dω is a modifier for the transient engine knock base noise level based on the rate of change of engine speed, Adj_cinj_dα is a modifier for the transient engine knock injector closing noise level based on rate of change of cylinder air charge that has a value of zero, Adj_oinj_dα is a modifier for the transient engine knock injector opening noise level based on rate of change of cylinder air charge that has a value of zero, Adj_cinj_dω is a modifier for the transient engine knock injector closing noise level based on rate of change of engine speed, Adj_oinj_dω is a modifier for the transient engine knock injector opening noise level based on rate of change of engine speed, Adj_ivlv_dα is a modifier for the transient engine intake poppet valve noise level based on the rate of change of cylinder air charge that has a value of zero, and Adj_ivlv_dω is a modifier for the transient engine intake poppet valve noise level based on the rate of change of engine speed, Adj_evlv_dα is a modifier for the transient engine exhaust poppet valve noise level based on the rate of change of cylinder air charge that has a value of zero, and Adj_evlv_dω is a modifier for the transient engine exhaust poppet valve noise level based on the rate of change of engine speed.

The values of modifiers Adj_base_dα, Adj_cinj_dα, Adj_oinj_dα, Adj_ivlv_dα, and Adj_evlv_dα are adjusted to values of zero because additional transient fuel is not provided and because the additional transient cylinder air charge may not be expected to increase vibrations of the engine block. Method 200 proceeds to 210.

At 210, method 200 adjusts the transient engine knock background noise level contributions Cyl_base_noise_trans(j), Cyl_inj_cnoise_trans(j), Cyl_inj_onoise_trans(j), Cyl_ivlv_noise_trans(j), and Cyl_evlv_noise_trans(j) to the total transient engine knock background noise level Cyl_bkg_noise_trans(j) responsive to a rate of change of cylinder air charge and the rate of change of engine speed. In one example, a modifier for each contribution to the total transient engine knock background noise level is applied as follows:

$$\begin{aligned}\text{Cyl\_bkg\_noise\_trans}(j) = &\text{Cyl\_base\_noise\_trans}(j)\cdot\\&(\text{Adj\_base\_d}\alpha + \text{Adj\_base\_d}\omega) + \text{Cyl\_inj\_}\\&\text{cnoise\_trans}(j)\cdot(\text{Adj\_cinj\_d}\alpha + \text{Adj\_cinj\_d}\omega) +\\&\text{Cyl\_inj\_onoise\_trans}(j)\cdot(\text{Adj\_oinj\_d}\alpha +\\&\text{Adj\_oinj\_d}\omega) + \text{Cyl\_ivlv\_noise\_trans}(j)\cdot\\&(\text{Adj\_ivlv\_d}\alpha + \text{Adj\_ivlv\_d}\omega) +\\&\text{Cyl\_evlv\_noise\_trans}(j)\cdot(\text{Adj\_evlv\_d}\alpha +\\&\text{Adj\_evlv\_d}\omega)\end{aligned}$$

where Cyl_bkg_noise_trans is the total transient engine knock background noise level including modifications for the rate of change in cylinder air charge and rate of change in engine speed, Adj_base_dα is a modifier (e.g., scalar real number) for the transient engine knock base noise level for the rate of change in cylinder air charge, Adj_base_dω is a modifier for the transient engine knock base noise level for the rate of change in engine speed, Adj_inj_dα is a modifier for the transient engine knock injector noise level for the rate of change in cylinder air charge, Adj_inj_dω is a modifier for the transient engine knock injector noise level for the rate of change in engine speed, Adj_ivlv_dα is a modifier for the transient engine intake poppet valve noise level for the rate of change in cylinder air charge, and Adj_ivlv_dω is a modifier for the transient engine intake poppet valve noise level for the rate of change in cylinder air charge for the rate of change in engine speed, Adj_evlv_dα is a modifier for the transient engine exhaust poppet valve noise level for the rate of change in cylinder air charge, and Adj_evlv_dω is a modifier for the transient engine exhaust poppet valve noise level for the rate of change in cylinder air charge for the rate of change in engine speed.

Method 200 also determines steady-state engine background noise levels as described at 220. Method 200 proceeds to 212 after adjusting the transient engine background noise contributions for the change in cylinder air charge and the change in engine speed.

At 212, method 200 adds the steady-state engine knock background noise levels to the transient engine knock background noise level for the present cylinder being evaluated for knock to determine the total engine knock background noise level. The total engine knock background noise level may be expressed as:

$$Cyl\_bkg\_noise(j) = Cyl\_bkg\_noise\_ss(j) + Cyl\_bkg\_noise\_trans(j)$$

where Cyl_bkg_noise(j) is the total engine knock background noise level for cylinder j (e.g., the present cylinder being evaluated for engine knock) that includes contributions for both steady-state engine knock background noise and transient engine knock background noise. Method 200 proceeds to 214 after determining the total engine knock background noise level for cylinder j.

At 214, method 200 method 200 assesses whether or not knock should be indicated for cylinder j based on the total engine knock background noise level for cylinder j. In one example, method 200 computes a knock intensity value for cylinder j by integrating sampled output of the knock sensor during the knock window of cylinder j and dividing the integrated knock sensor output by the total engine knock background noise level for cylinder j. If the knock intensity value exceeds a threshold value (e.g., 2), then knock is indicated for the cylinder j and spark timing for the cylinder j is retarded by a predetermined amount. The spark is retarded for cylinder j and then the spark timing is advanced back toward the MBT (minimum spark advance for best engine torque at the present engine speed and load) spark timing for cylinder j. For example, if the knock intensity value for cylinder number one exceeds a threshold level, then knock is indicated for cylinder number one and spark timing of cylinder number one is retarded by five crankshaft degrees. The spark timing for cylinder number one may be advanced by five crankshaft degrees within ten seconds of when the spark timing of cylinder number one was retarded based on knock. If knock is not indicated, spark timing for the cylinder remains at its requested or base timing (e.g., knock limited spark timing or MBT timing). Knock for each cylinder may be determined in this way. The cylinder number j may be adjusted according to an engine firing order each engine cycle (e.g., two revolutions) so that knock is evaluated for each engine cylinder each engine cycle. Method 200 proceeds to exit after adjusting engine spark timing in cylinder j for engine knock.

Thus, the method of FIG. 2 provides for an engine operating method, comprising: assessing an engine for knock via a controller according to a total engine knock background noise level that includes individual contributions (e.g., amount values such as the value 2) for steady-state and transient engine knock base background noise levels; and adjusting engine operation according to the assessment. The method includes where the steady-state and transient engine knock base background noise levels do not include noise from fuel injectors that opening or closing during a crankshaft angular interval where an engine knock window is open. The contribution values may be unique and individual. The method includes where the individual contributions include at least two contribution values. The method includes where the steady-state and transient engine knock base background noise levels do not include noise from poppet valves that close during a crankshaft angular interval where an engine knock window is open. The method includes where the total engine knock background noise level includes individual contributions for steady-state and transient engine background noise levels that include noise for poppet valves that close during a crankshaft angular interval where an engine knock window is open. The method includes where the total engine knock background noise level includes individual contributions for steady-state and transient engine background noise levels that include noise for fuel injectors that open or close during a crankshaft angular interval where an engine knock window is open. The method includes where the engine knock window is a crankshaft angular interval where output of a knock sensor is sampled. The method further comprises detecting a transient condition based on a rate of engine speed change or a change in cylinder air charge.

The method of FIG. 2 provides for an engine operating method, comprising: sensing a transient engine operating condition via a controller; adding a transient engine knock background noise contribution to a steady-state engine knock background noise contribution in response to sensing the transient engine operating condition; and adjusting engine operation according to an indication of knock, the indication of knock based on the transient engine knock background noise contribution. The method further comprises generating the indication of knock based on the steady-state engine knock background noise contribution. The method further comprises adjusting the transient engine knock background noise contribution responsive to a rate of change of engine speed. The method further comprises adjusting the transient engine knock background noise contribution responsive to a rate of change of cylinder air charge. The method includes where the transient engine knock background noise contribution includes individual contributions of poppet valve noise and fuel injector noise. The method includes where the steady-state engine knock background noise contribution includes individual contributions of poppet valve noise and fuel injector noise.

Figure 3:
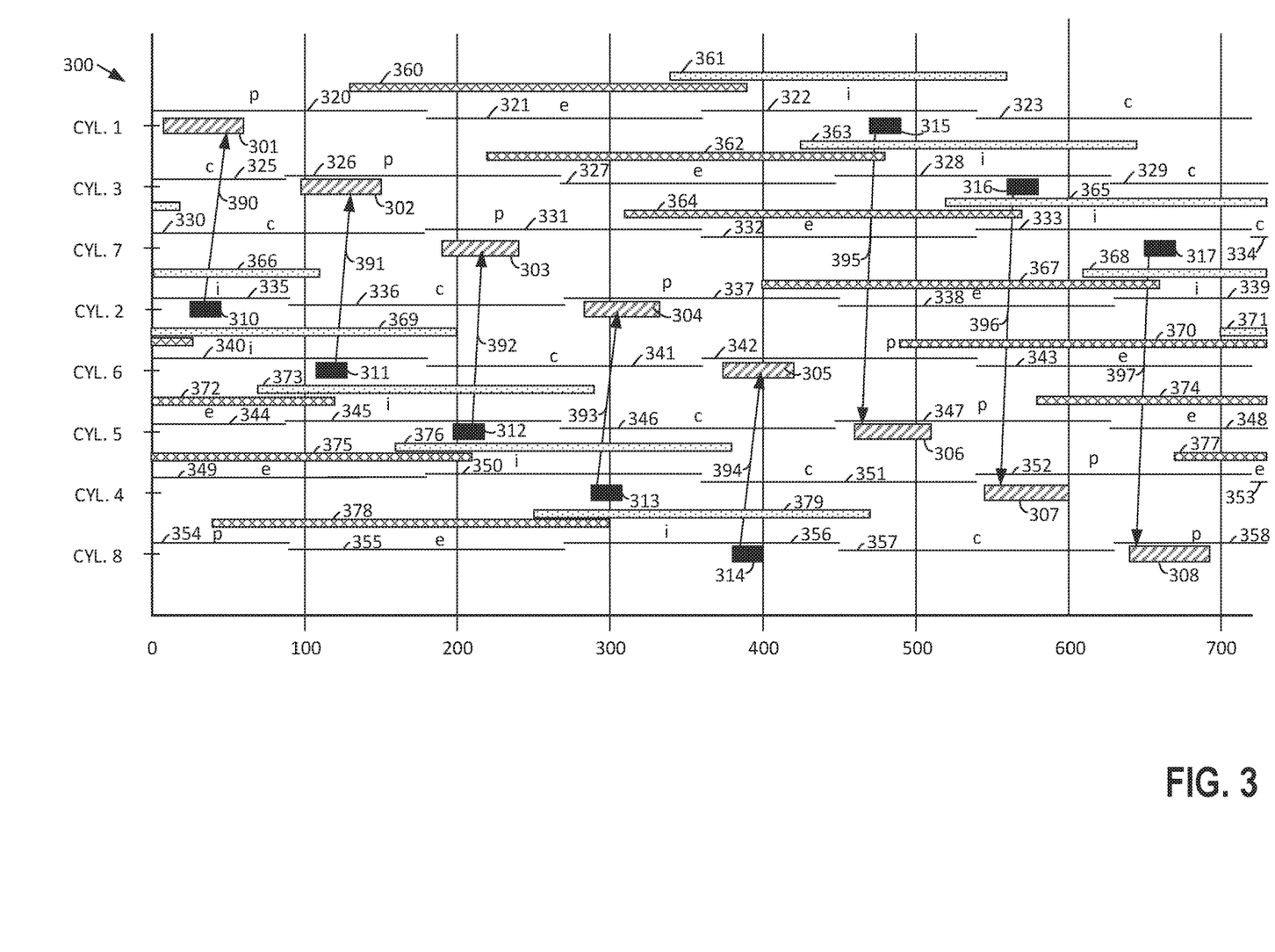
FIG. 3 shows an example engine operating sequence that includes engine knock windows.

Referring now to FIG. 3, a timing sequence 300 that illustrates example base engine knock window timing, direct injector timing, and intake and exhaust poppet valve opening and closing timing for an operating engine (e.g., engine that is combusting fuel) is shown. The illustrated timings are for an eight cylinder engine that has a firing order of 1-3-7-2-6-5-4-8. The engine is a four stroke engine that has a cycle of 720 crankshaft degrees. The engine crankshaft degrees are located along the horizontal axis and zero degrees represents top-dead-center compression stroke for cylinder number one. The eight cylinders are labeled along the vertical axis. In this example, several engine knock background noise influences are shown visually by DI injections and poppet valve timings. The sequence of FIG. 3 may be provided via the system of FIGS. 1A-1C and the method of FIG. 2.

The engine knock windows for each cylinder are positioned at a level of a tick mark along the vertical axis that is associated with the knock window. For example, the engine knock window for or associated with cylinder number one is indicated by slash bar 301. Knock windows for the remaining engine cylinders (2-8) are indicated by similar slash bars (302-308) that align with labeling along the vertical axis. The controller may sample (e.g., measure) output of the knock sensor when a knock window of a cylinder is open. An open knock window is a crankshaft region where engine knock may be expected for a particular engine cylinder.

The engine fuel injection timings for each cylinder are positioned at a level the tick mark along the vertical axis that is associated with the fuel injection. For example, solid bar 310 represents a DI fuel injector open interval for cylinder number two. The DI fuel injector for cylinder number two is closed when solid bar 310 is not visible. The DI fuel injector for cylinder number two opens at the left side of solid bar 310 and closes at the right side of solid bar 310. DI fuel injections for the remaining engine cylinders (2-8) are indicated by similar solid bars (311-317) and they follow the same convention as solid bar 310. The fuel injector bars 310-317 respectively align with cylinders listed along the vertical axis that the fuel injector bars correspond to.

The strokes of a cylinder are positioned just above a level the tick mark along the vertical axis that is associated with the stroke. For example, strokes for cylinder number one are indicated by horizontal lines 320-323. Letters p, e, i, and c identify the power (p), exhaust (e), intake (i), and compression (c) strokes associated with cylinder number one. Strokes for the other engine cylinders are identified in a similar way by lines 325-358.

The exhaust valve timings for each cylinder are positioned above a level the tick mark along the vertical axis that is associated with the exhaust valve timings. For example, exhaust valve opening time for cylinder number one is indicated by cross-hatched bar 360. The exhaust valves for cylinder number one are closed when no cross-hatched bar is present above the cylinder strokes of cylinder number one. Exhaust valve opening times for the other cylinders are indicated at 362, 364, 367, 370, 372, 374, 375, 377, and 378.

The intake valve timings for each cylinder are positioned above a level the tick mark along the vertical axis that is associated with the intake valve timings. For example, intake valve opening time for cylinder number one is indicated by dotted bar 361. The intake valves for cylinder number one are closed when no dotted bar is present above the cylinder strokes of cylinder number one. The intake valve opening times for the other cylinders are indicated at 363, 365, 366, 368, 369, 371, 373, 376, and 379.

The engine noise observed in a knock window of one cylinder may include noise related to events associated with other engine cylinders. For example, the engine knock window of cylinder number two indicated at 304 may occur at a time when the knock sensor is exposed to noise from the DI injection to cylinder number four at 313 and this linkage is shown via arrow 393. The relations between DI injections to other cylinders and the knock sensor output in other knock windows are illustrated via arrows 390-397. Thus, the engine knock background noise level determined for the engine knock window of cylinder number two shown at 304 may include noise generated by the DI injector opening and/or closing at 313. In addition, the intake valve closing of cylinder number five indicated by dotted bar 373 show that the intake valve of cylinder number five closes and may generate noise within the time that the knock window of cylinder number two is open as shown by bar 304. Further, the exhaust valve closing of cylinder number eight indicated by dotted bar 378 shows that the exhaust valve of cylinder number eight closes and may generate noise within the time that the knock window of cylinder number two is open as shown by bar 304. Further still, the exhaust valve opening of cylinder number seven indicated by bar 364 shows that the exhaust valve of cylinder number seven opens and may generate noise within the time that the knock window of cylinder number two is open as shown by bar 304. Thus, in this example, engine background noise as determined via the engine knock window for cylinder number two at 304 may include noise from DI event 313, valve event 373, valve event 364, and valve event 378.

The poppet valve and DI injection times shown in FIG. 3 may be indicative of base DI and poppet valve timings. These timings may affect the engine background noise levels determined from engine knock windows of the cylinders (e.g., 304). While it may be desirable to include all background noise sources to determine a background noise level for a particular cylinder, it may also be useful to decompose a total background noise level into the contributions from individual noise sources. By removing one or more noise influences from a total engine background noise level, it may be possible to determine engine noise levels that may be used to determine whether or not knock is present in other cylinders. For example, a base engine knock background noise level for cylinder number one may be used as a base engine knock background noise level for cylinder number three. Further, the poppet valve noise or DI injector noise of one cylinder may be applied to a different cylinder to estimate engine knock background noise for the different cylinder. Such allocations of engine knock background noise levels may be useful when an engine knock background noise level has not been observed for a particular engine cylinder or if opportunities for learning engine knock background noise levels is limited by vehicle operating conditions. Output of a knock sensor may be sampled (e.g., measured) via the controller and processed when a knock window is open as shown at windows 301-308.

Referring now to FIG. 4, a block diagram 400 of a way to determine a total engine background noise level for a cylinder being evaluated for engine knock is shown. Block diagram 400 graphically describes a portion of the method of FIG. 2.

Output voltage of a knock sensor is sampled (e.g., measured via the controller) and filtered via a band-pass filter at block 402. The filtered knock sensor output is then integrated at block 404. The integrated knock sensor output for cylinder (j) is input to knock evaluation block 406.

Engine speed and engine load are input to blocks 410, 416, 424, 428, 436, 440, 448, 452, 460, and 462 to lookup steady-state and transient values of engine knock base background noise, steady-state and transient values of engine knock direct injector opening background noise, steady-state and transient values of engine knock direct injector closing background noise, steady-state and transient values of engine knock intake valve closing (IVC) background noise, and steady-state and transient values of engine knock exhaust valve closing (EVC) background noise.

Steady-state engine knock base background noise level is output from block 410 and it is input into summing junction 412 where it is added to the outputs of summing junctions 426, 438, and 450. The output of summing junction 412 (e.g., the sum of steady-state engine knock base background noise, steady-state engine knock direct injector closing background noise, steady-state engine knock direct injector opening background noise, steady-state engine knock intake valve closing background noise, and steady-state engine knock exhaust valve closing background noise) is input into summing junction 414. The output of summing junction 412 is added to the output of summing junction 422 (e.g., the sum of transient engine knock base background noise, transient engine knock direct injector closing background noise, transient engine knock direct injector opening background noise, transient engine knock intake valve closing background noise, and transient engine knock exhaust valve closing background noise) at summing junction 414 to determine the total engine knock background noise level. Block 406 judges if knock is present for the cylinder being evaluated for knock by dividing the output of block 404 by the output of summing junction 414. If the result of the division is greater than a threshold, then knock is indicated in the cylinder that is being evaluated for knock.

Steady-state engine knock direct injector opening background noise level is output from block 424 and it is input into summing junction 426 where it is added to the outputs of summing junctions 438, and 450. Steady-state engine knock direct injector closing background noise level is output from block 436 and it is input into summing junction 438 where it is added to the output of summing junction 450. Steady-state engine knock intake valve closing background noise level is output from block 448 and it is input into summing junction 450 where it is added to the steady-state engine knock exhaust valve closing background noise level.

Transient engine knock base background noise level is output from block 416 and it is multiplied at 419*b* by the sum of modifiers based on the rate of engine speed change and the rate of engine load change determined at 419*a* from blocks 418 (e.g., Adj_base_dα) and 420 (e.g., Adj_base_dω). The output of block 419*b* is added to the output of blocks 431*b*, 443*b*, 455*b*, and 465*b* at summing junction 422.

Transient engine knock direct injector opening background noise level is output from block 428 and it is multiplied at 431*b* by the sum of modifiers based on the rate of engine speed change and the rate of engine load change determined at 431*a* from blocks 430 (e.g., Adj_oinj_dα) and 432 (e.g., Adj_oinj_dω). The output of block 431*b* is added to the output of blocks 443*b*, 455*b*, and 465*b* at summing junction 434.

Transient engine knock direct injector closing background noise level is output from block 444 and it is multiplied at 443*b* by the sum of modifiers based on the rate of engine speed change and the rate of engine load change determined at 443*a* from blocks 442 (e.g., Adj_cinj_dα) and 444 (e.g., Adj_cinj_dω). The output of block 443*b* is added to the output of blocks 455*b* and 465*b* at summing junction 446.

Transient engine knock intake valve closing background noise level is output from block 452 and it is multiplied at 455*b* by the sum modifiers based on the rate of engine speed change and the rate of engine load change determined at 445*a* from blocks 454 (e.g., Adj_ivlv_dα) and 456 (e.g., Adj_ivlv_dω). The output of block 455*b* is added to the output of block 465*b* at summing junction 458.

Transient engine knock exhaust valve closing background noise level is output from block 462 and it is multiplied at 465*b* by the sum of modifiers based on the rate of engine speed change and the rate of engine load change determined at 465*a* from blocks 464 (e.g., Adj_evlv_dα) and 466 (e.g., Adj_evlv_dω). The output of block 465*b* is added to the output of block 455*b* at summing junction 458.

In this way, steady-state and transient values for engine knock base background noise, engine knock direct injector opening background noise, engine knock direct injector closing background noise, engine knock IVC background noise, and engine knock direct injector closing background noise, engine knock EVC background noise may be including in determining a total engine background noise level for a cylinder that is being evaluated for knock.

Referring now to FIG. 5, a prophetic operating sequence according to the method of FIG. 2 is shown. The vehicle operating sequence shown in FIG. 5 may be provided via the method of FIG. 2 in cooperation with the system shown in FIGS. 1A-1C. The plots shown in FIG. 5 occur at the same time and are aligned in time. Vertical lines at time t0-t3 represent times of interest during the sequence.

The first plot from the top of FIG. 5 is a plot of engine knock sensor output voltage versus time. The vertical axis represents knock sensor output voltage and the knock sensor output voltage increases in the direction of the vertical axis arrow. The horizontal axis represents time and time increases from the left side of the figure to the right side of the figure. Trace 502 represents the knock sensor output voltage.

The second plot from the top of FIG. 5 is a plot of steady-state engine background noise level versus time. The vertical axis represents steady-state engine background noise level and the amount of steady-state engine background noise level increases in the direction of the vertical axis arrow. The horizontal axis represents time and time increases from the left side of the figure to the right side of the figure. Trace 504 represents steady-state engine background noise level.

The third plot from the top of FIG. 5 is a plot of transient engine background noise level versus time. The vertical axis represents transient engine background noise level and the transient engine background noise level increases in the direction of the vertical axis arrow. The horizontal axis represents time and time increases from the left side of the figure to the right side of the figure. Trace 506 represents transient engine background noise level.

The fourth plot from the top of FIG. 5 is a plot of total engine knock background noise level versus time. The vertical axis represents total engine knock background noise level and total engine knock background noise level increases in the direction of the vertical axis arrow. The horizontal axis represents time and time increases from the left side of the figure to the right side of the figure. Trace 508 represents total engine knock background noise level.

The fifth plot from the top of FIG. 5 is a plot of integrated knock sensor output versus time. The vertical axis represents integrated knock sensor output and integrated knock sensor output increases in the direction of the vertical axis arrow. The horizontal axis represents time and time increases from the left side of the figure to the right side of the figure. Trace 510 represents integrated knock sensor output.

The sixth plot from the top of FIG. 5 is a plot of engine knock indication state versus time. The vertical axis represents engine knock indication state and engine knock is indicated when trace 512 is at a higher level near the vertical axis arrow. Engine knock is not indicated when trace 512 is at a lower level near the horizontal axis. The horizontal axis represents time and time increases from the left side of the figure to the right side of the figure. Trace 512 represents transient engine knock indication state.

The seventh plot from the top of FIG. 5 is a plot of engine spark advance versus time. The vertical axis represents engine spark advance and engine spark advance increases in the direction of the vertical axis arrow. The horizontal axis represents time and time increases from the left side of the figure to the right side of the figure. Trace 514 represents engine spark advance.

The eighth plot from the top of FIG. 5 is a plot of driver demand torque (e.g., engine torque requested by a human driver of the vehicle) versus time. The vertical axis represents driver demand torque and driver demand torque increases in the direction of the vertical axis arrow. The horizontal axis represents time and time increases from the left side of the figure to the right side of the figure. Trace 516 represents driver demand torque.

At time t0, the engine is running (e.g., combusting fuel) (not shown) and the engine knock sensor is not indicating that engine knock is present. The steady-state engine knock background noise level as determined via one or more functions that may be referenced via engine speed and load is at a lower level. The transient engine knock background noise level is zero and engine knock is not indicated. The total engine background noise level is low and the integrated knock sensor output is low. The engine spark timing is advanced and the driver demand torque is low.

At time t1, the driver demand torque increases and output of the knock sensor indicates a low engine knock level. The steady-state engine knock background noise level increases by a small amount and the transient engine knock background noise level briefly increases in response to the change in driver demand torque. The total engine background noise level increases and then decreases after the transient is complete. Likewise, the integrated knock sensor output increases a small amount and then it decreases after the transient is complete. Engine knock is not indicated and spark timing retard is increased by a small amount in response to the engine load change, but spark timing is not retarded in response to an indication of engine knock since engine knock is not indicated.

At time t2, the driver demand torque increases again and output of the knock sensor indicates a higher engine knock level. The steady-state engine knock background noise level increases by a larger amount and the transient engine knock background noise level also increases in response to the change in driver demand torque. The total engine background noise level increases more than after time t1 and then it decreases after the transient is complete. Similarly, the integrated knock sensor output increases a larger amount and then it decreases after the transient is complete. Engine knock is not indicated and spark timing retard is increased by a small amount in response to the engine load change, but spark timing is not retarded in response to an indication of engine knock since engine knock is not indicated. Engine knock is not indicated because the integrated knock signal output dividend by the total engine background noise is not greater than a threshold level.

At time t3, the driver demand torque increases again and output of the knock sensor indicates a significantly higher engine knock level. The steady-state engine knock background noise level increases in response to the change in engine load and the transient engine knock background noise level increases in response to the change in driver demand torque. The transient engine background noise level increases and the total engine background noise level also increases in response to the transient. This time, the integrated knock sensor output increases significantly more than the total engine background noise. The integrated knock sensor output divided by the total engine background noise level is greater than a threshold value so knock is indicated. The engine spark timing retard is increased by a larger amount (spark is retarded more) in response to the engine load change and the indication of engine knock. The spark retard is gradually decreased as time elapses after time t3.

Thus, an indication of engine knock may be based on both steady-state and transient engine knock background noise levels so that detection of engine knock may be improved. During conditions where engine knock is indicated, spark timing may be retarded to reduce the possibility of continuing engine knock.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example examples described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific examples are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. An engine operating method, comprising:
assessing an engine for knock via a controller according to a total engine knock background noise level that includes individual contributions for steady-state and transient engine knock base background noise levels, where the total engine knock background noise level includes individual contributions for steady-state and transient engine knock background noise levels that include noise for fuel injectors that open or close during a crankshaft angular interval where an engine knock window is open; and
adjusting engine operation according to the assessment.

2. The method of claim 1, where the individual contributions include at least two contribution values.

3. The method of claim 1, where the steady-state and transient engine knock base background noise levels do not include noise from poppet valves that close during the crankshaft angular interval where the engine knock window is open.

4. The method of claim 1, where the total engine knock background noise level includes individual contributions for steady-state and transient engine knock background noise levels that include noise for poppet valves that close during the crankshaft angular interval where the engine knock window is open.

5. The method of claim 1, where the engine knock window is the crankshaft angular interval where output of a knock sensor is sampled.

6. The method of claim 5, further comprising detecting a transient condition based on a rate of engine speed change or a change in cylinder air charge.

7. The method of claim 6, where the transient engine knock background noise contribution includes individual contributions of poppet valve noise and fuel injector noise.

8. The method of claim 6, where the steady-state engine knock background noise contribution includes individual contributions of poppet valve noise and fuel injector noise.

9. An engine operating method, comprising:
sensing a transient engine operating condition via a controller;
adding a transient engine knock background noise contribution to a steady-state engine knock background noise contribution in response to sensing the transient engine operating condition;
adjusting engine operation according to an indication of knock, the indication of knock based on the transient engine knock background noise contribution; and
adjusting the transient engine knock background noise contribution responsive to a rate of change of engine speed.

10. The method of claim 9, further comprising generating the indication of knock based on the steady-state engine knock background noise contribution.

11. The method of claim 9, further comprising adjusting the transient engine knock background noise contribution responsive to a rate of change of cylinder air charge.

12. A system for operating an engine, comprising:
the engine including at least one vibration sensing engine knock sensor; and
a controller including executable instructions stored in non-transitory memory to generate a total engine knock background noise level from individual and unique contributions of transient and steady-state engine knock base background noise levels that do not include noise from poppet valves and fuel injectors closing during a knock window, and adjust engine operation responsive to the total engine knock background noise level.

13. The system of claim 12, further comprising additional instructions to adjust the transient engine knock base background noise level responsive to a rate of change of engine speed.

14. The system of claim 12, further comprising additional instructions to adjust the transient engine knock base background noise level responsive to a rate of change of engine load.

15. The system of claim 12, further comprising additional instructions to generate the total engine knock background noise level from a transient engine knock background noise level that includes noise of a poppet valve closing during the knock window.

16. The system of claim 12, further comprising additional instructions to generate the total engine knock background noise level from a transient engine knock background noise level that includes noise of a fuel injector closing during the knock window.

17. The system of claim 12, where adjusting engine operation includes retarding spark timing.

* * * * *